US009075368B2

(12) United States Patent
Mukaibara

(10) Patent No.: US 9,075,368 B2
(45) Date of Patent: Jul. 7, 2015

(54) HIGH VOLTAGE GENERATING DEVICE AND IMAGE FORMING APPARATUS

(75) Inventor: Takuya Mukaibara, Susono (JP)

(73) Assignee: CANON KABUSHIKI KAISHA, Tokyo (JP)

(*) Notice: Subject to any disclaimer, the term of this patent is extended or adjusted under 35 U.S.C. 154(b) by 32 days.

(21) Appl. No.: 13/603,199

(22) Filed: Sep. 4, 2012

(65) Prior Publication Data
US 2013/0070484 A1 Mar. 21, 2013

(30) Foreign Application Priority Data

Sep. 16, 2011 (JP) ................. 2011-203417

(51) Int. Cl.
H02M 3/335 (2006.01)
G03G 15/00 (2006.01)
H02M 1/36 (2007.01)

(52) U.S. Cl.
CPC ............ *G03G 15/5004* (2013.01); *H02M 1/36* (2013.01); *H02M 3/33507* (2013.01); *G03G 15/80* (2013.01)

(58) Field of Classification Search
None
See application file for complete search history.

(56) References Cited

U.S. PATENT DOCUMENTS

| 4,791,528 | A | * | 12/1988 | Suzuki et al. | 361/235 |
|---|---|---|---|---|---|
| 4,868,729 | A | * | 9/1989 | Suzuki | 363/21.15 |
| 4,980,811 | A | * | 12/1990 | Suzuji et al. | 363/21.07 |
| 5,621,630 | A | * | 4/1997 | Suzuki et al. | 363/71 |
| 5,963,437 | A | * | 10/1999 | Sekiya | 363/21.16 |
| 6,229,721 | B1 | | 5/2001 | Mano et al. | |
| 6,804,126 | B2 | * | 10/2004 | Lucas | 363/21.01 |
| 6,813,170 | B2 | * | 11/2004 | Yang | 363/56.09 |
| 6,853,562 | B2 | * | 2/2005 | Zhang | 363/21.06 |
| 7,362,591 | B2 | * | 4/2008 | Inukai | 363/21.01 |
| 2008/0298091 | A1 | * | 12/2008 | Inukai | 363/21.1 |
| 2011/0194871 | A1 | * | 8/2011 | Matsumoto | 399/88 |
| 2012/0027447 | A1 | * | 2/2012 | Mukaibara | 399/88 |
| 2012/0027448 | A1 | * | 2/2012 | Mukaibara | 399/88 |

FOREIGN PATENT DOCUMENTS

| JP | 09-093920 | * | 9/1995 |
|---|---|---|---|
| JP | H09-093920 A | | 4/1997 |
| JP | 2001169546 | * | 12/1999 |
| JP | 2003228216 | * | 8/2003 |
| JP | 2004-088965 A | | 3/2004 |
| JP | 2004088965 | * | 3/2004 |
| JP | 2013066298 | * | 4/2013 |

* cited by examiner

*Primary Examiner* — Timothy J Dole
*Assistant Examiner* — Monica Mata
(74) *Attorney, Agent, or Firm* — Fitzpatrick, Cella, Harper & Scinto

(57) ABSTRACT

A high voltage generating device includes a control portion configured to raise a voltage output from a transformer to a first voltage by controlling a driving signal generated by a signal generating portion based on a voltage detected by a voltage detecting portion. The control portion raises the voltage with a predetermined rate of change until the voltage detected by the voltage detecting portion reaches a value of a second voltage smaller than a value of the first voltage, and the control portion raises the voltage output from the transformer with a rate of change smaller than the predetermined rate of change after the voltage detected by the voltage detecting portion reaches the value of the second voltage.

10 Claims, 11 Drawing Sheets

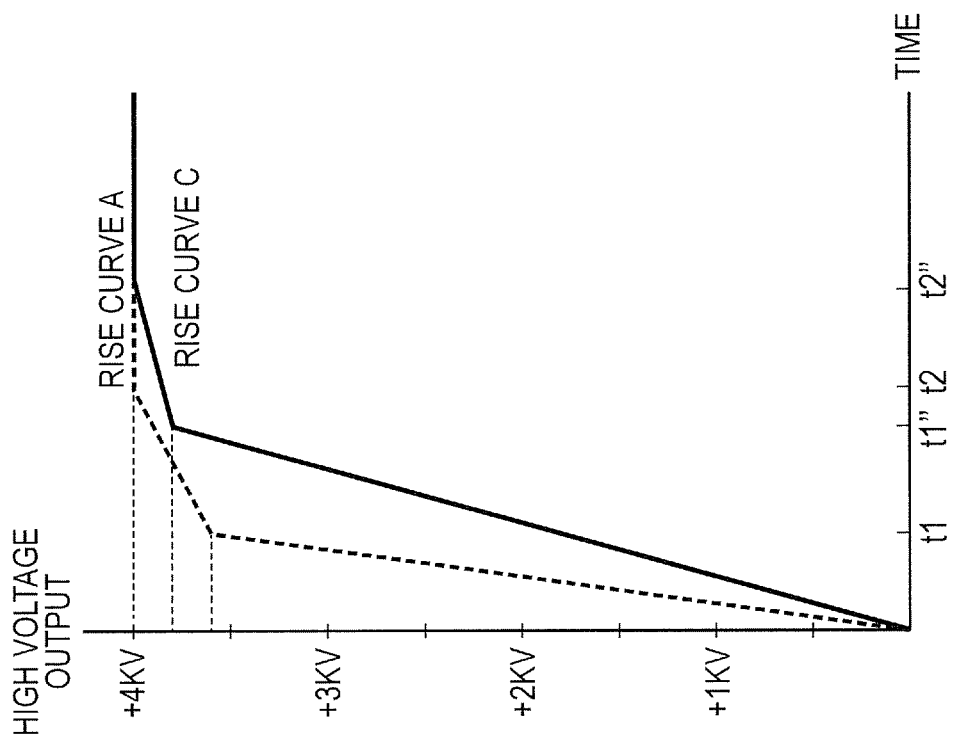
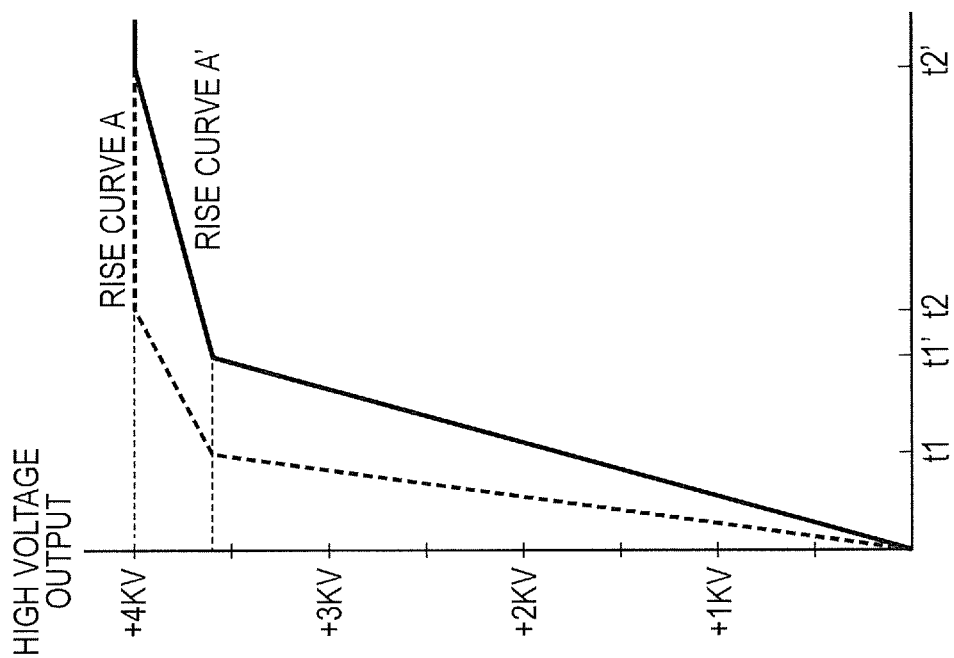

HIGH VOLTAGE GENERATING DEVICE AND IMAGE FORMING APPARATUS

BACKGROUND OF THE INVENTION

1. Field of the Invention

The present invention relates to a high voltage generating device for outputting a high voltage, and more particularly, to a high voltage generating device configured to raise a high voltage to a target voltage at a high speed and an image forming apparatus including the high voltage generating device.

2. Description of the Related Art

In an electrophotographic image forming apparatus, a surface of an electrophotographic photosensitive member (hereinafter, referred to as a "photosensitive drum") is uniformly charged by a charging device, and the surface of the charged photosensitive drum is exposed by an exposing device, thus forming an electrostatic latent image on the surface of the photosensitive drum. The electrostatic latent image is developed by a developing device with a developer (hereinafter, referred to as "toner") to form a toner image, and the developed toner image is transferred to a recording material by a transfer device. The toner image is fixed to the recording material by a fixing device, and then the recording material on which an image is thus formed is output. A transfer roller is used as the transfer device, which forms a nip portion with the photosensitive drum and conveys the recording material through the nip portion. A high voltage of an opposite polarity with respect to the toner (hereinafter, referred to as a "transfer voltage") is applied to the transfer roller, by which the toner image is transferred to the recording material.

The resistance of the transfer roller is likely to fluctuate in accordance with the ambient temperature and humidity, and if a desired transfer current value is not obtained, an image defect such as a transfer failure or a ghost may occur. The following control is performed to reduce the transfer failure or the image defect. That is, in order to optimize the transfer voltage to be applied to the transfer roller, a resistance value of the transfer roller is measured, and the transfer voltage is controlled in an appropriate manner based on a result of the measurement. This control method is a known control method referred to as an active transfer voltage control (ATVC). By performing this control, the transfer voltage can be applied to maintain an applied current value to an appropriate value even when the impedance of the transfer roller fluctuates due to a change of the environment.

As to the ATVC control, in these days, a method of executing the control by software in a controller has become a mainstream instead of a control by hardware. This is an effective method for achieving simplified and stable circuit configuration and control. Specifically, the transfer voltage is applied to the transfer roller as a constant voltage, and the applied current value detected by hardware is monitored by a controller. A process of obtaining the transfer voltage (voltage value) to be applied is executed by software based on the monitored current value and a target current value. However, if an output range of the transfer voltage and a range of a load fluctuation are broad, the method of executing the control by the software may cause the following problems. For example, if the characteristic of an applied voltage at the time of start-up is greatly changed due to a load condition (such as a load fluctuation), a fluctuation of a start time until the transfer voltage converges to the target voltage may occur, or an overshoot or an undershoot may occur. This may cause a degradation of the image quality or a deterioration of the photosensitive drum.

In a disclosure of Japanese Patent Application Laid-Open No. 2004-088965, an average value of the impedance is calculated from an output value obtained by performing an A/D conversion multiple times from an edge of the recording material and an output voltage obtained by a feedback. A value of a PWM signal (on-duty width) is calculated based on two conditions including a range of the calculated average value (first condition) and a range of a difference between the current output value and the target current value (second condition). According to the disclosure of Japanese Patent Application Laid-Open No. 2004-088965, a convergence time to a desired transfer voltage by a control of the software can be shortened, and the overshoot or the undershoot can be reduced.

As another example of raising the high voltage to the target voltage at a high speed, the following configuration is disclosed in Japanese Patent Application Laid-Open No. H09-093920. That is, there is proposed a method involving comparing a detection voltage of a voltage detecting circuit with a second reference voltage slightly lower than a reference voltage, and if the detection voltage of the voltage detecting circuit exceeds the second reference voltage, controlling a speed of charging a capacitor, which is a load, to be slower. In the disclosure of Japanese Patent Application Laid-Open No. H09-093920, a rapid charging area, a slow charging area, and a hold charging area are provided in order from the time of start-up, and upon starting the start-up, the voltage is rapidly raised by setting the on-duty width of a PWM signal to the maximum on-duty width. When an output voltage reaches the second reference voltage value (about 90% as an example), it is switched to the slow charging area. An integrating circuit is provided on an input side of a circuit for generating a pulse of the PWM signal, the rapid charging is performed at an initial stage of the rising by the integrating circuit. After that, the overshoot and the undershoot are suppressed by slightly charging and discharging in the slow charging area and the hold charge area.

An effort is being made to achieve a high-speed control of the transfer voltage and to reduce the overshoot and the undershoot. In these days, it is demanded to further shorten a time period from a time when a print instruction is issued (a print command is sent) from a computer or the like till a time when a printing on the first recording material is completed, to enhance a productivity of the image forming apparatus. Hereinafter, the time period from the issuance of the print instruction till the completion of the printing on the first recording material is referred to as a first print out time (FPOT). By shortening the FPOT, a user can achieve a merit that the printing is completed in a short time since the print instruction is issued. In order to shorten the FPOT further, a time required for the ATVC control needs to be further shortened.

The control method of converging to the target voltage by the software, which is described in Japanese Patent Application Laid-Open No. 2004-088965, provides an effect of shortening the time to some extent. However, because a setting update by the software is executed at a certain interval, a control cycle is relatively long. In addition, a convergence time is needed for an accumulated number of updates. For this reason, there is a limit in the control by the software for the purpose of convergence to the target voltage in a shorter period of time. In the control method described in Japanese Patent Application Laid-Open No. 2004-088965, the convergence to the target voltage is performed with an open loop control by changing an on-duty width of a PWM signal for switching booster transformers. In this control method, an output value is detected after waiting a start-up of the hardware (reaching a steady area), and then the next setting value is updated. It can achieve a high speed if there is a characteristic in which the on-duty width and the output voltage (a value reached in the steady area without a feedback control) have a linear relationship therebetween. However, it is not easy to construct a circuit having a linear characteristic, and it is hard to maintain the linearity due to an influence of fluctuation in a time constant of the circuit and each element. If the linearity cannot be maintained, a difference occurs in a change amount of the output voltage even with the change amount in the same time width, resulting in degradations of the stability and the accuracy of the output voltage control. On the other hand, if an attempt is made to enhance the linearity, another problem is likely to occur conversely, such as a degradation of responsiveness.

In the disclosure of Japanese Patent Application Laid-Open No. H09-093920, a control of maintaining the output voltage to the target voltage by slightly increasing or decreasing the output voltage with a slight increase or decrease of an input voltage is performed with respect to a circuit for outputting the pulse of the PWM signal in the hold charging area in which a control of holding the target voltage is executed. However, when making a transition from the slow charging area to the hold charging area, the input voltage is only decreased by a considerably small amount, and hence it is hard to reduce the overshoot voltage. In order to reduce the overshoot voltage, the rise of the voltage in the slow charging area needs to be even slower. However, if the rise of the voltage is too slow, it will cause a long rise time. In addition, if the circuit is configured to use an integrating circuit on the input side of the circuit for outputting the PWM pulse, it takes a start-up time (integrating time) when the on-duty width of the PWM signal rises from zero to the maximum on-duty width.

SUMMARY OF THE INVENTION

The present invention enables an output voltage to reach a target voltage in a short time without generating an overshoot or an undershoot at the time of rising even in a high voltage generating device in which a rise time is greatly shortened and the target voltage is set in a broad range.

According to an exemplary embodiment of the present invention, there is provided a high voltage generating device, including: a transformer; a driving portion configured to drive the transformer; a signal generating portion configured to generate a driving signal for driving the driving portion; a voltage detecting portion configured to detect a voltage output from the transformer; and a control portion configured to raise the voltage output from the transformer to a first voltage by controlling the driving signal generated by the signal generating portion based on the voltage detected by the voltage detecting portion, the control portion raising the voltage output from the transformer with a predetermined rate of change until the voltage detected by the voltage detecting portion reaches a value of a second voltage smaller than a value of the first voltage, the control portion raising the voltage output from the transformer with a rate of change smaller than the predetermined rate of change after the voltage detected by the voltage detecting portion reaches the value of the second voltage.

According to another exemplary embodiment of the present invention, there is provided an image forming apparatus, including: an image forming portion configured to form an image; and a high voltage generating portion configured to apply a high voltage to the image forming portion, the high voltage generating portion including: a transformer; a driving portion configured to drive the transformer; a signal generating portion configured to generate a driving signal for driving the driving portion; a voltage detecting portion configured to detect a voltage output from the transformer; and a control portion configured to raise the voltage output from the transformer to a first voltage by controlling the driving signal generated by the signal generating portion based on the voltage detected by the voltage detecting portion, the control portion raising the voltage output from the transformer with a predetermined rate of change until the voltage detected by the voltage detecting portion reaches a value of a second voltage smaller than a value of the first voltage, the control portion raising the voltage output from the transformer with a rate of change smaller than the predetermined rate of change after the voltage detected by the voltage detecting portion reaches the value of the second voltage.

Further features of the present invention will become apparent from the following description of exemplary embodiments with reference to the attached drawings.

BRIEF DESCRIPTION OF THE DRAWINGS

FIGS. 9A and 9B illustrate an example of a high voltage output waveform when performing the rising according to the second embodiment.

DESCRIPTION OF THE EMBODIMENTS

A configuration and an operation of the present invention are described below. Exemplary embodiments described below are one or more examples of the present invention, and should not be construed to limit the technical scope of the present invention. The exemplary embodiments of the present invention are now described in detail with reference to the accompanying drawings.

A first embodiment of the present invention is described.

(Output Waveform of the High Voltage Generating Device)

A high voltage generating device according to the first embodiment or a high voltage generating device according to a second embodiment of the present invention that is to be described later performs a feedback control by setting a transient target voltage for switching a slew rate during a transient rise period for performing a rise control. A driving of a booster transformer is started with an input driving condition that an output value reaches an attainment target value with a steep slew rate in a transient state. Regardless of a magnitude of the target value, the output value can converge to the target value in a short time without having an overshoot.

Figure 1:
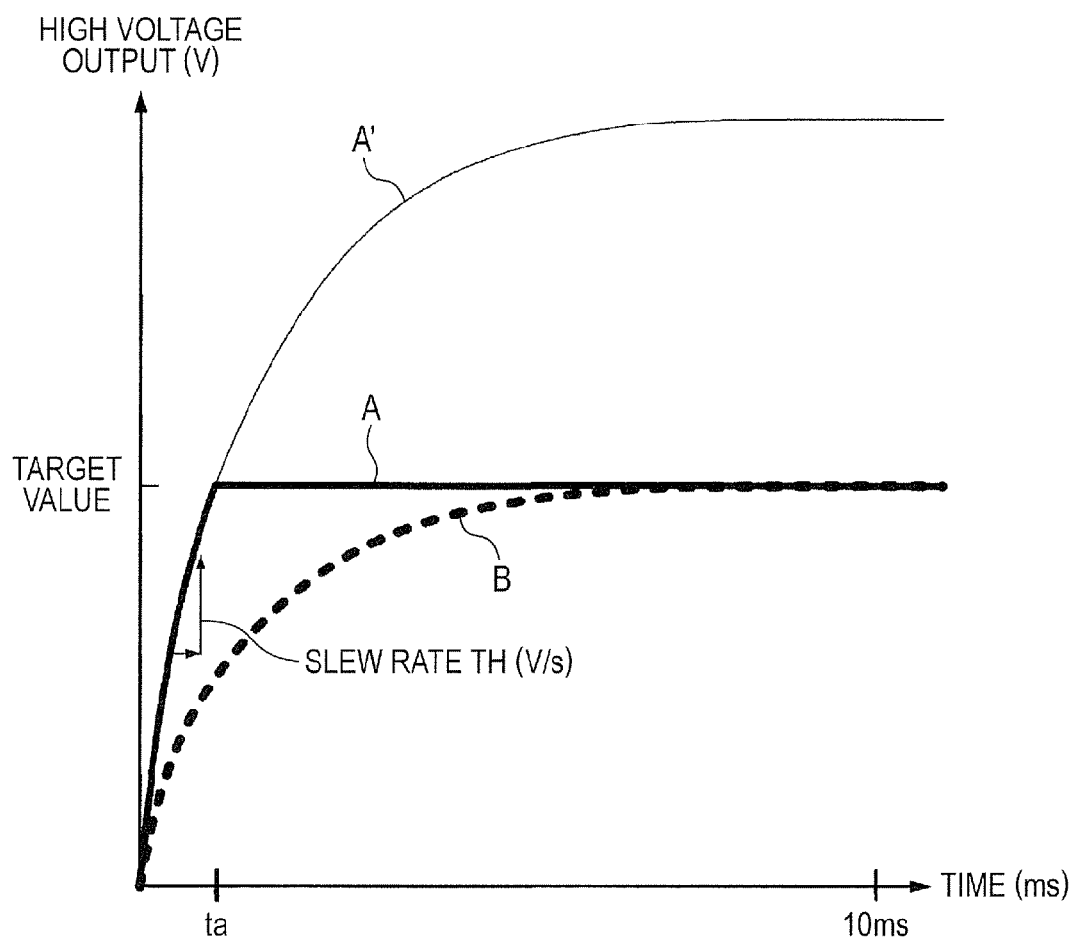
FIG. 1 illustrates a voltage waveform of an output value of a high voltage generating device, in which the output value reaches a target value in a transient slew rate state, according to a first embodiment or a second embodiment.

Regarding the high voltage generating device in which the output value reaches the attainment target value with the steep slew rate, a specific output waveform is described with reference to FIG. 1. FIG. 1 is a graph in which the horizontal axis represents time (millisecond (ms)), and the vertical axis represents high voltage output (V). A waveform B indicates an example of the waveform in a state in which an output voltage of the high voltage generating device rises toward the target value while following a time constant curve. A waveform A' indicates a case where the booster transformer is driven with an input driving condition that the output voltage reaches the target value or higher, where the time constant is the same as that for the waveform B. On the other hand, the time required for reaching the same target value is considerably faster. The output voltage is raised to the target value or near the target value by using a rapid slew rate portion TH (V/s) at this transient time. After that, as indicated by a waveform A, the high voltage generating device according to the first embodiment performs a high speed feedback control (constant voltage control) for maintaining the target value by a high-speed constant voltage control circuit of a hardware.

In the high voltage generating device according to the first embodiment, a transient time area from a time when the high voltage generating device is started to a time when the output voltage reaches the target voltage is divided into a rapid rise period T1 right after the start-up and a constant voltage control standby period T2 before the output voltage reaches the target voltage. The detection of a predetermined transient target voltage triggers a transition from the rapid rise period T1 to the constant voltage control standby period T2. An on-duty width of a PWM signal for switching between the rapid rise period T1 and the constant voltage control standby period T2 is set in each period in a switchable manner. In the constant voltage control standby period T2 before the output voltage reaches the target voltage, the on-duty width is narrowed to suppress a rise capability to be lower. The transition from the rapid rise period T1 to the constant voltage control standby period T2 in this transient state is performed by the detection of the predetermined transient target voltage. When a target voltage value to which the output voltage finally reaches (hereinafter, referred to as a "final attainment target value") is large, the transient target voltage is set to a slightly smaller value, and when the final attainment target value is small, the transient target voltage is set to an even smaller value.

(High Voltage Generating Device)

Figure 2A:
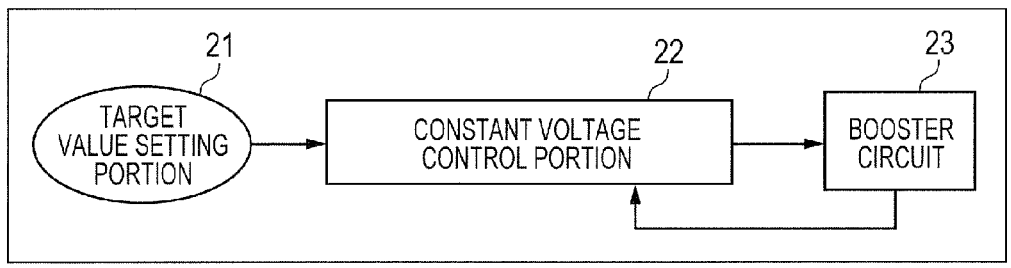
FIG. 2A is a functional block diagram of a high voltage generating device according to a comparative example.
Figure 2B:
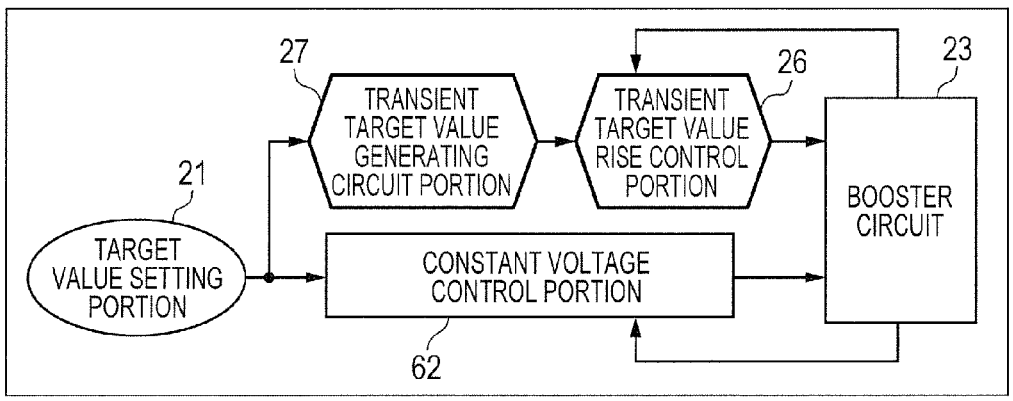
FIG. 2B is a functional block diagram of the high voltage generating device according to the first embodiment.

FIG. 2B is a functional block diagram of a main portion of the high voltage generating device according to the first embodiment. FIG. 2A illustrates a high voltage generating device according to a comparative example for comparing with the first embodiment. In the high voltage generating device for comparing, a constant voltage control portion 22 monitors an output portion of a booster circuit 23 and performs a feedback control of an input portion such that an output becomes an output set by a target value setting portion 21. The high voltage generating device according to the first embodiment further includes a transient target value generating circuit 27 that generates a transient target voltage for making a transition from the rapid rise period T1 to the constant voltage control standby period T2 in a variable manner, and a transient target value rise control portion 26.

Figure 3:
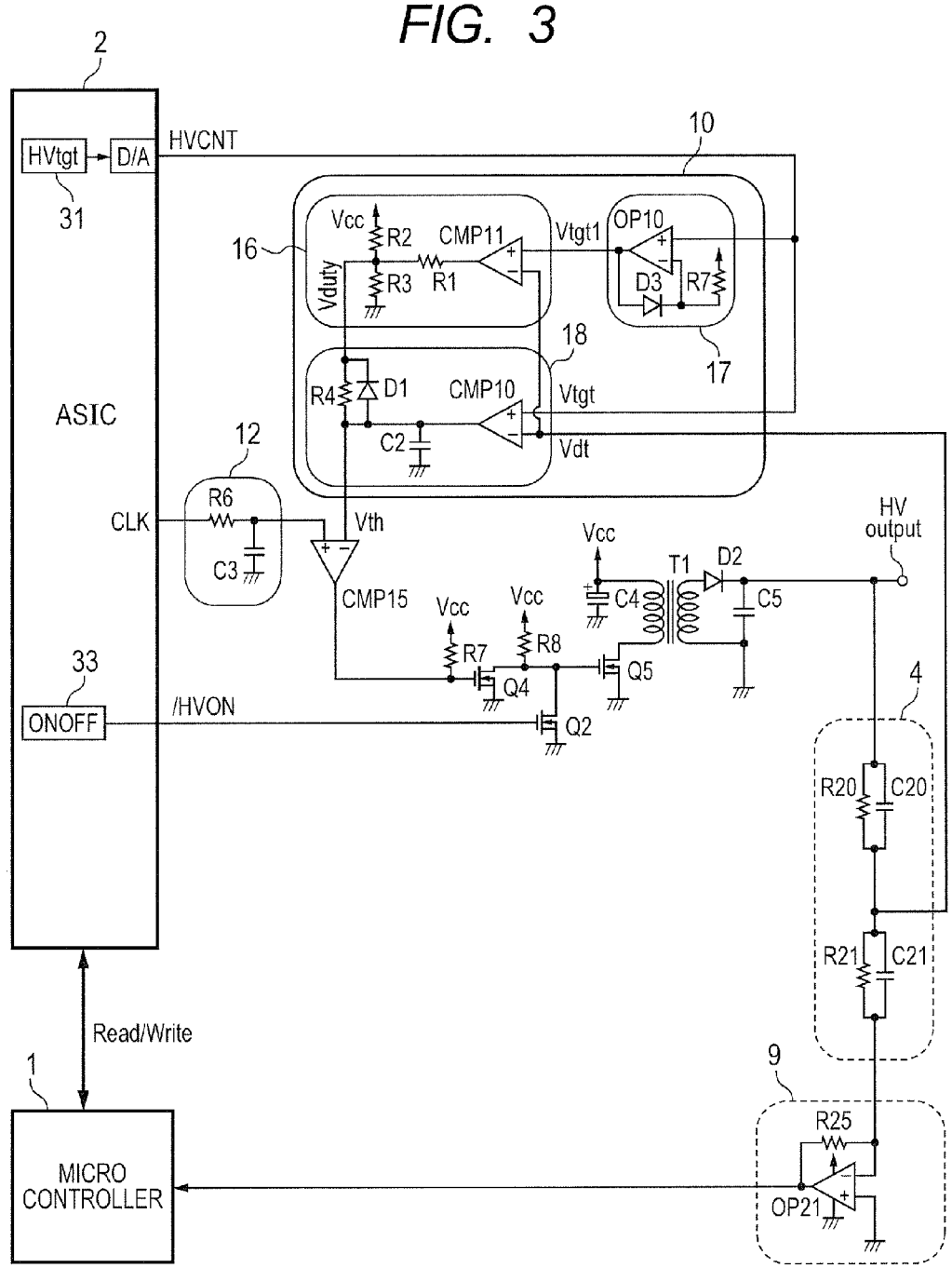
FIG. 3 illustrates a circuit configuration of the high voltage generating device according to the first embodiment.

Now, a schematic construction of the high voltage generating device illustrated in FIG. 3 is described below. The high voltage generating device illustrated in FIG. 3 includes the following constructions. That is, there are a high voltage generating circuit formed of an analog circuit, an ASIC 2 that generates a hardware control signal to be output to the high voltage generating circuit, and a micro controller 1 that controls and sets an output state of the hardware control signal of the ASIC 2. The micro controller 1 and the ASIC 2 correspond to the target value setting portion 21 illustrated in FIG. 2B, and the micro controller 1 sets a target value to be described later to the ASIC 2. A portion of the high voltage generating circuit formed of the analog circuit includes a booster circuit and includes the following constructions. That is, there are a booster circuit including a booster transformer T1 and its surrounding circuits, an output voltage detecting circuit 4, a comparator CMP15 that generates a PWM signal for driving the booster transformer T1, a PWM control voltage generating circuit 10, and an output current detecting circuit 9.

The micro controller 1 sets a predetermined value at a predetermined timing for each of a HVtgt portion 31 that is a register for setting the final attainment target value and an ON/OFF setting portion that is a register for an ON/OFF setting (hereinafter, referred to as an "ON/OFF setting portion") 33, which are constituted in the ASIC 2. Whereby, the micro controller 1 controls a change of the target output value of the high voltage generating device and the ON/OFF timing. In FIG. 3, reading and setting of information performed by the micro controller 1 with respect to the ASIC 2 are indicated as Read/Write. The ASIC 2 outputs a high voltage control signal HVCNT corresponding to the HVtgt portion 31 to the outside via a D/A converter as an analog signal. Further, the ASIC 2 outputs an ON/OFF control signal/HVON corresponding to the ON/OFF setting portion 33 and a clock signal CLK having a predetermined cycle used in the high voltage generating circuit to the outside. The high voltage control signal HVCNT may be a signal output as a PWM signal and may be converted to a DC voltage value by a high order low pass filter having an improved response characteristic in a PWM frequency, which satisfies the same function.

(Outline of an Operation of the High Voltage Generating Circuit)

An outline of an operation of the high voltage generating circuit in the high voltage generating device illustrated in FIG. 3 is described. The booster transformer T1 (transformer) is switched and driven according to the PWM signal (driving signal) generated by the comparator CMP15 (generating unit). A high voltage output from the booster transformer T1 is voltage divided and detected by the output voltage detecting circuit 4 (voltage detecting unit). The detected divided voltage Vdt is compared with a target voltage Vtgt (first voltage value) set by the high voltage control signal HVCNT by a comparator CMP10. The on-duty width of the PWM signal output from the comparator CMP15 is then feedback controlled in response to a comparison result by the comparator CMP10. The booster transformer T1 is switched and driven by the feedback controlled on-duty width. The feedback control by the comparator CMP10 is performed in a steady area.

In a transient state right after the start-up, the raising with a steep slew rate is performed in a stage before the detected voltage Vdt reaches a transient target voltage Vtgt1 (second voltage value) as the rapid rise period T1. The transition to a slow slew rate is performed in a stage after the detected voltage Vdt reaches the transient target voltage Vtgt1 as the constant voltage control standby period T2, to thereby be raised toward the final attainment target value.

A detailed operation of the high voltage generating circuit in the high voltage generating device illustrated in FIG. 3 is described below. An operation of the comparator CMP15 is first described. An output of the PWM control voltage generating circuit 10 (control unit) and an output of a pseudo-triangular wave generating circuit 12 are coupled to the comparator CMP15. The pseudo-triangular wave generating circuit 12 is an example of generating a pseudo-triangular wave in a simplified manner by using the clock signal CLK, a resistor R6, and a capacitor C3. The generation of the triangular wave may be performed by other types of triangular wave generating circuits. The PWM control voltage generating circuit 10 generates a PWM control voltage Vth that works as a slice level when generating the PWM signal from the triangular wave. The comparator CMP15 outputs the on-duty width of the PWM signal in a variable manner by comparing the triangular wave signal coupled to a non-inverting input portion and the PWM control voltage Vth coupled to an inverting input portion. The comparator CMP15 outputs the PWM signal having the narrower duty width on a low level side as the voltage value Vth of the inverting input portion is lower. In the first embodiment, the duty width of the low level of the PWM signal output from the comparator CMP15 is an on-duty width at the time of operating the high voltage generating circuit. Therefore, the duty width of the low level of the PWM signal becomes narrower as the voltage value Vth is lower, thus the on-duty width becomes narrower.

(PWM Control Voltage Generating Circuit)

The PWM control voltage generating circuit 10 that outputs the PWM control voltage Vth to the comparator CMP15 is described below. The high voltage control signal HVCNT output from the ASIC 2 and the voltage (hereinafter, referred to as a "detection voltage value") Vdt that is a detection value of a load voltage detected by the output voltage detecting circuit 4 are coupled to the PWM control voltage generating circuit 10. A final attainment target value of the load voltage is set by the high voltage control signal HVCNT, and the PWM control voltage generating circuit 10 performs a feedback control of the PWM control voltage Vth to be output to the comparator CMP15 while monitoring the detection voltage value Vdt from the output voltage detecting circuit 4.

(Transient Target Value Generating Circuit)

The PWM control voltage generating circuit 10 includes a maximum duty switching circuit 16, a transient target value generating circuit 17, and an output voltage control circuit 18. The maximum duty switching circuit 16 corresponds to the transient target value rise control portion 26 illustrated in FIG. 2B. A specific method of the transient target value rise controlling performed by the transient target value rise control portion 26 is a switching control of the maximum duty width for driving the booster transformer T1 to be described later. The transient target value generating circuit 17 is illustrated as the transient target value generating circuit 27 in FIG. 2B. The output voltage control circuit 18 corresponds to a constant voltage control portion 62 illustrated in FIG. 2B. The transient target value generating circuit 17 (setting unit) generates a voltage signal Vtgt1, which is obtained by dropping the high voltage control signal HVCNT output from the ASIC 2 by a predetermined offset potential, as the transient target value. For example, a circuit that generates a voltage signal obtained by dropping by a zener voltage of a zener diode D3 is illustrated. There are an operational amplifier OP10 and a resistor R7.

(Maximum Duty Switching Circuit)

The transient target value Vtgt1 is coupled to a comparator CMP11 of the maximum duty switching circuit 16, and is compared with the detection voltage value Vdt of the load portion (load). When the detection voltage value Vdt is equal to or lower than the transient target value Vtgt1, an output of the comparator CMP11 becomes opened. The maximum duty switching circuit 16 outputs a voltage Vduty, which is obtained by dividing a power source voltage Vcc with resistors R2 and R3, to the output voltage control circuit 18. The voltage Vduty is the maximum value of the slice level when the comparator CMP15 generates the PWM signal. That is, the voltage Vduty sets the maximum on-duty width of the PWM signal generated by the comparator CMP15.

On the other hand, when the detection voltage value Vdt is equal to or higher than the transient target value Vtgt1, the output of the comparator CMP11 becomes a low level. The voltage Vduty output by the maximum duty switching circuit 16 is dropped to a divided value also including a resistor R1. Thereby, the slice level drops when the comparator CMP15 generates the PWM signal. That is, the duty width of the low level of the PWM signal generated by the comparator CMP15 is changed to a narrower width, in other words, the maximum on-duty width is changed to a narrower width. When dropping the voltage Vduty, a switching of the voltage Vduty is instantly performed by discharging an electrical charge of a charged capacitor C2 via a diode D1 in the output voltage control circuit 18.

The maximum duty switching circuit 16 immediately switches the PWM control voltage Vth instantly at a time when the detection voltage value Vdt of the load portion reaches the transient target value Vtgt1. Whereby, an operation of switching a width of the low level of the PWM signal output from the comparator CMP15, in other words, the on-duty width to a narrower width is performed.

(Output Voltage Control Circuit)

The output voltage control circuit 18 is described below. The output voltage control circuit 18 is a circuit portion that performs a constant voltage control for maintaining the high voltage of the load portion reached to the final attainment target value to a predetermined value. The comparator CMP10 compares the target voltage value Vtgt set by the high voltage control signal HVCNT output from the ASIC 2 with the detection voltage value Vdt of the load portion, and when the detection voltage value Vdt is equal to or lower than the target voltage value Vtgt, it becomes to the open output. On the other hand, when the detection voltage value Vdt is equal to or higher than the target voltage value Vtgt, an electrical charge of the capacitor C2 is rapidly discharged by outputting the low level. When the electrical charge of the capacitor C2 is rapidly discharged, the inverting input portion of the comparator CMP15 is instantly dropped to 0 V potential, and therefore, the output of the comparator CMP15 becomes a high level instantly, causing the high voltage generating circuit to be an OFF state rapidly.

When the output of the comparator CMP10 is changed again from the low level to the open output, the capacitor C2 is charged via a resistor R4 such that the PWM control voltage Vth becomes the output voltage Vduty of the maximum duty switching circuit 16. A time constant of the charging is determined by values of the resistors R2 to R4 and the capacitor C2. A circuit for slowly broadening the on-duty width from zero is constituted by this time constant. When the detection voltage value Vdt exceeds the target voltage value Vtgt, the output voltage control circuit 18 instantly sets the on-duty width to zero to rapidly turn off the high voltage generating circuit. On the other hand, when the detection voltage value Vdt is lower than the target voltage value Vtgt, the high voltage generating circuit is slowly turned on by setting the time constant on the start-up. As a result, a voltage oscillation (ripple and hunching) generated by the feedback control for maintaining the constant voltage can be greatly suppressed. An output waveform of the steady area in the high voltage generating device according to the first embodiment becomes a waveform shown in FIG. 7D to be described later.

(Surrounding Circuits of the Transformer)

Surrounding circuits of the booster transformer T1 constituted in the high voltage generating circuit are described below. The PWM signal output from the comparator CMP15 is input to a gate terminal of a FET Q4. The small signal FET Q4, the power source voltage Vcc, and a resistor R8 drive a gate terminal of a power MOSFET Q5 in accordance with the PWM signal input to the gate terminal of the FET Q4. The power MOSFET Q5 (driving unit) drives switching of the booster transformer T1. The switched and driven booster transformer T1 outputs an alternate-current high voltage. The alternate-current high voltage output by the booster transformer T1 is rectified into a direct-current voltage by a rectifier (rectifying unit) including a high voltage diode D2, a high voltage capacitor C5, and the output voltage detecting circuit 4, and is output to the load portion HVoutput. The high voltage output to the load portion HVoutput is divided and detected by the output voltage detecting circuit 4. The detected divided voltage Vdt is monitored by the comparator CMP10 and the comparator CMP11, and compared with the target voltage value Vtgt set by the high voltage control signal HVCNT to perform the feedback control for maintaining the target voltage. FIG. 3 illustrates resistors R7, R20, R21, and R25, and capacitors C4, C20, and C21. The output current detecting circuit 9 includes the resistor R25, an Operational amplifier OP21, detects the current flowing through the load portion HVoutput, and outputs a detection result to the micro controller 1.

The ON/OFF control signal/HVON directly controls the gate terminal of the power MOSFET Q5 with a FET Q2, and hence a response delay time at the time of switching on and off can be suppressed to a small value. When a slightly delayed response delay time does not cause a serious problem, the high voltage generating circuit may be switched on and off by setting the clock signal CLK output from the ASIC 2 to a fixed output of the high level instead of using the ON/OFF control signal/HVON and the FET Q2.

(Comparison with a Comparative Example Regarding the Transient Target Value)

Figure 4A:
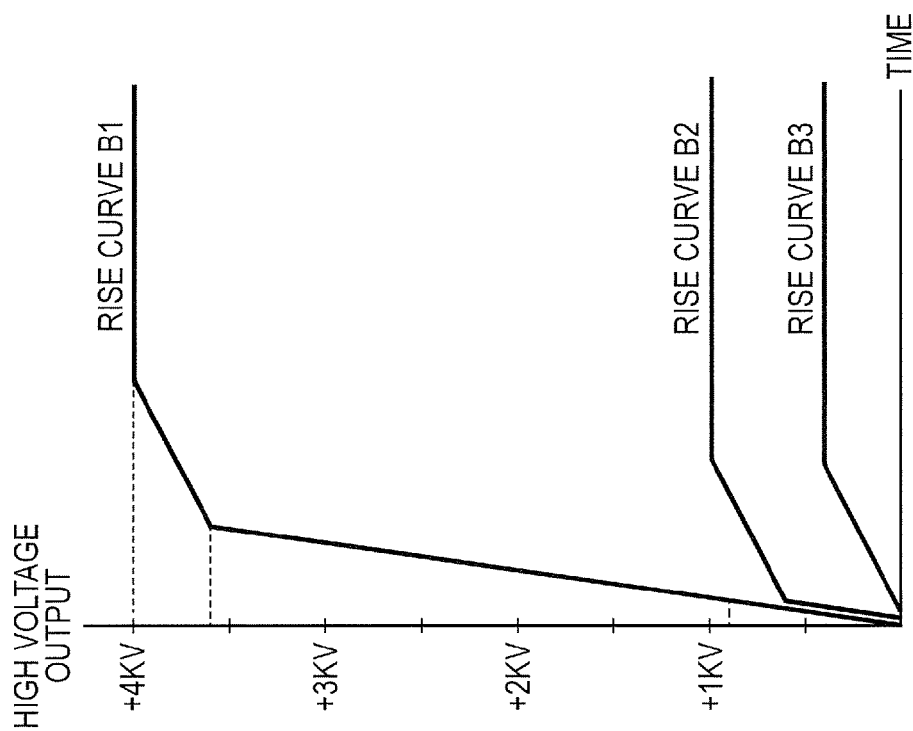
FIG. 4A illustrates an example of a high voltage output waveform when performing the rising according to the comparative example.
Figure 4B:
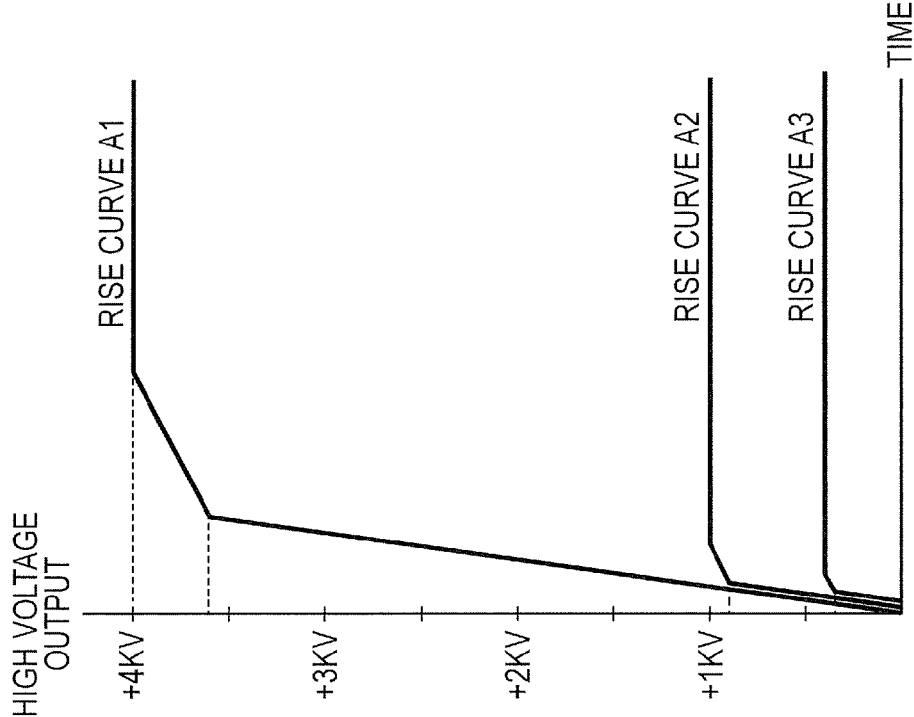
FIG. 4B illustrates an example of a high voltage output waveform when performing the rising according to the first embodiment.

The transient target value of the first embodiment is described in detail by comparing with a comparative example with reference to FIGS. 4A and 4B. Curves of FIGS. 4A and 4B are drawn by being slightly shifted from one another on the time axis for the sake of convenience in order to clarify a difference between the curves. FIG. 4A is a graph of a high voltage output waveform obtained when a load voltage is raised with a raising capability of the comparative example based on the transient target value and the final attainment target value according to the comparative example. A rise curve A1 is a high voltage output waveform obtained by detecting +3.6 kV, which is 90% of the final attainment target value of +4 kV, as the transient target value and changing the rise slew rate. A rise curve A2 is a high voltage output waveform obtained when the rise is performed with 900 V, which is 90% of the final attainment target value of +1 kV, as the transient target value. A rise curve A3 is a high voltage output waveform obtained when the rise is performed with 360 V, which is 90% of the final attainment target value of +400 V, as the transient target value. In all the cases of the rise curves, the transient target value is set to a slightly lower value of the final attainment target value, that is, 90% thereof.

FIG. 4B is a graph of a high voltage output waveform at the time of rising based on the transient target value and the final attainment target value according to the first embodiment. A rise curve B1 is a high voltage output waveform obtained by detecting +3.6 kV, which is 90% of the final attainment target value of +4 kV, as the transient target value and changing the rise slew rate. A rise curve B2 is a high voltage output waveform obtained when the rise is performed with 600 V, which is 60% of the final attainment target value of +1 kV, as the transient target value. A rise curve B3 is obtained when the rise is performed with the transient target value of 0 V with respect to the final attainment target value of +400 V, which is a state in which no transient target value is set in an actual operation, it is raised with a slow slew rate from the initial stage of the rise. That is, in the first embodiment, the transient target value is set to a slightly lower value than the final attainment target value when the final attainment target value is high, and to a greatly lower value than the final attainment target value when the final attainment target value is low. In other words, a predetermined transient target value is used when the final attainment target value is high, and when the final attainment target value is low, a greatly lower (smaller) transient target value is used compared to the transient target value used when the final attainment target value is high. In this manner, as the final attainment target value is lower, the transient target value becomes even lower. As a result, in the case where the raising capability of the high voltage generating device is dramatically increased, it can be raised without an overshoot even when the target value is small in the rise curves shown in the graph of FIG. 4B. On the other hand, in the rise curves according to the comparison example shown in the graph of FIG. 4A, a considerable overshoot is generated when the target value is small.

Figure 5A:
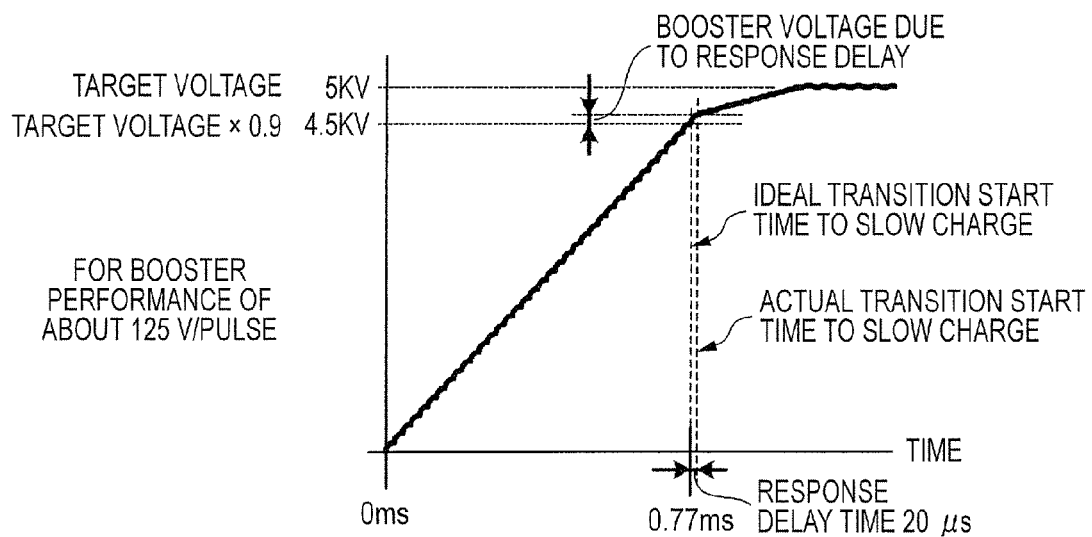
FIGS. 5A and 5B illustrate an example of voltage rise waveforms of the high voltage generating devices according to the first embodiment and the comparative example with a target voltage of +5 kV.

Specific examples of the high voltage waveform generated by applying the functions of the analog circuit and the ASIC 2 of the high voltage generating device are shown in FIGS. 5A to 7D. A comparison with a waveform obtained when a high voltage generating device having a comparative configuration is operated at a high speed is employed for the following description. For example, a driving frequency of the booster transformer is set to 50 kHz (20-microsecond (µs) cycle), and an input/output response time (delay time) of a booster circuit including the booster transformer and a rectifier is set to 20 µs. A case of a high voltage generating device having a raising capability of raising a few hundred volts by a switching driving of one pulse is described as an example. The input/output response time of the booster circuit is dominant in the delay time, and hence other delay times are assumed to be zero in the description. A case where the final attainment target voltage is set to 5 kV is shown in FIGS. 5A and 5B, and a case where the final attainment target voltage is set to 1 kV is shown in FIGS. 6A to 6C, an example is described in which the target value is set in a broad range from small to large value in a variable manner.

(When the Final Attainment Target Voltage is 5 kV According to the Comparative Example)

Figure 5B:
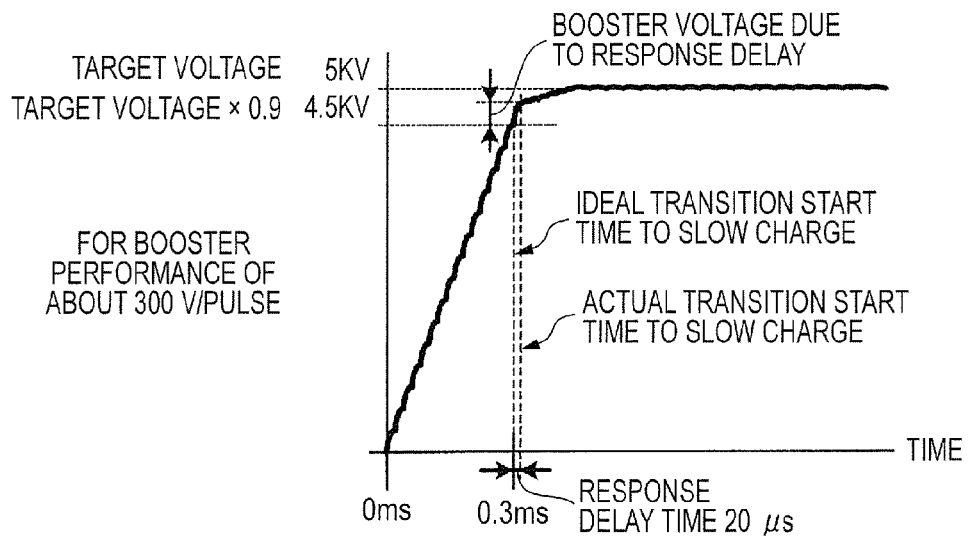

A case where the final attainment target voltage is set to 5 kV is described with reference to FIGS. 5A and 5B. FIGS. 5A and 5B are respectively an example of a waveform of a high voltage generating device that slowly switches the rise curve of the output voltage in the middle of the rise. In particular, FIGS. 5A and 5B respectively show an example of the rise waveform assuming a high voltage generating device of a type that slows down the rise of the output voltage by detecting a transient target voltage slightly lower than a target voltage. Hereinafter, a transient area of the rapid rise period T1 right after the start-up is referred to as a first transient area, and a transient area of the constant voltage control standby period T2 in which the rise is slowed down after the first transient area is referred to as a second transient area. In the high voltage generating device of the comparative example of FIGS. 5A and 5B, a detection of the output voltage is performed at the transient target voltage slightly lower than the final attainment target voltage, and hence the voltage that can be controlled at this time is a voltage output after 20 μs. Even when the driving of the booster transformer T1 can be stopped at a time of 0 ms since the detection, an overshoot is generated at 20 μs later in the high voltage generating device that raises the voltage of the output portion by a few hundred volts with one pulse. A specific example is described below.

FIG. 5A illustrates an example of the output waveform of the high voltage generating device in which the transient target voltage is set to 90% of the final attainment target voltage and the voltage is raised by 125 V with one-pulse driving in the first transient area. The final attainment target voltage value is 5 kV, and hence a detection of the voltage is performed at the transient target voltage of 4.5 kV that is 90% of the target, and then the second transient area starts. However, the power driven 20 μs before entering the second transient area is already input, and hence the output voltage is raised to 4.625 kV, and the second transient area starts after the voltage exceeds 4.625 kV. That is, although the voltage reaches the transient target voltage of 4.5 kV in 0.77 ms since the start-up (0 ms), the second transient area does not start at the ideal transition start time of 0.77 ms to the slow charging. The actual transition start time to the slow charging is after the response delay time of 20 μs. Therefore, a voltage rise of 0.125 kV is generated due to the response delay. In this example, the second transient area starts from 4.625 kV, and hence the voltage converges to the final attainment target value of 5 kV without having a large overshoot.

FIG. 5B illustrates an example of the output waveform of the high voltage generating device in which the transient target voltage is set to 90% of the voltage and the voltage is raised by 300 V with one-pulse driving in the first transient area. The final attainment target voltage value is 5 kV, and hence a detection of the voltage is performed at the transient target voltage of 4.5 kV that is 90% of the target, and then the second transient area starts. However, the power driven 20 μs before entering the second transient area is already applied, and hence the output voltage is raised to 4.8 kV, and the second transient area starts after the voltage exceeds 4.8 kV. That is, although the voltage reaches the transient target voltage of 4.5 kV in 0.3 ms since the start-up (0 ms), the second transient area does not start at the ideal transition start time of 0.3 ms to the slow charging. The actual transition start time to the slow charging is after the response delay time of 20 μs. Therefore, a voltage rise of 0.3 kV is generated due to the response delay. In this example, the second transient area starts from 4.8 kV, and hence the voltage converges to the final attainment target value of 5 kV without having a large overshoot, although a margin for an overshoot exceeding 5 kV is not large.

Therefore, when the final attainment target voltage is 5 kV, the voltage converges to the target value of 5 kV without having a large overshoot whether the voltage raised with the one-pulse driving by the high voltage generating device is 125 V or 300 V at a higher speed.

(When the Final Attainment Target Voltage is 1 kV According to the Comparative Example)

Figure 6A:
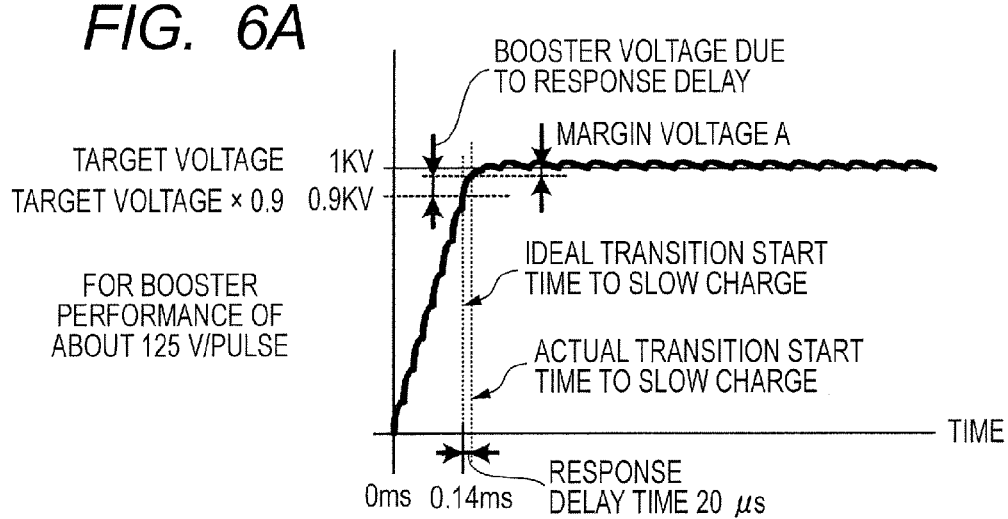
FIGS. 6A and 6B illustrate an example of voltage rise waveforms of the high voltage generating device according to the comparative example with a target voltage of +1 kV.
Figure 6B:
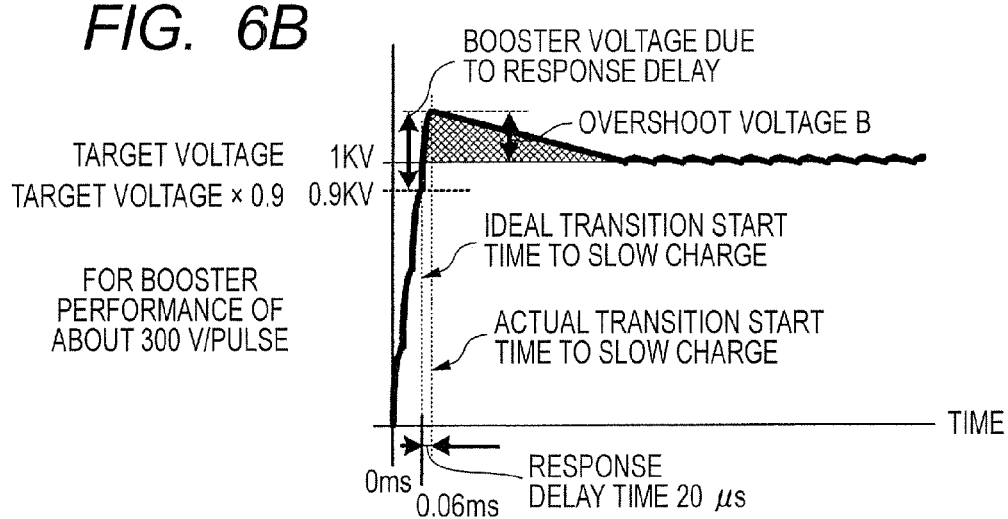

As shown in FIG. 6B, when the target voltage value is small and the raising capability is high (target voltage value of 1 kV, raises 300 V with one-pulse driving), an overshoot is generated. This case is described from a case where the target voltage value is small and the raising capability is somewhat high (target voltage value of 1 kV, raises 125 V with one-pulse driving) with reference to FIG. 6A. FIG. 6A is an example of the output waveform of the high voltage generating device in which the transient target voltage is set to 90% of the voltage and the voltage is raised by 125 V with one-pulse driving in the first transient area. The final attainment target voltage value is 1 kV, and hence a detection of the voltage is performed at the transient target voltage of 0.9 kV that is 90% of the target, and then the second transient area starts. However, the power driven before entering the second transient area is already applied, and hence the output voltage is raised to 1 kV to start the second transient area. That is, although the voltage reaches the transient target voltage of 0.9 kV in 0.14 ms since the start-up (0 ms), the second transient area does not start at the ideal transition start time of 0.14 ms to the slow charging. The actual transition start time to the slow charging is after the response delay time of 20 μs. Therefore, a voltage rise of 0.125 kV is generated due to the response delay. In this example, the second transient area starts from 1 kV, and hence the voltage converges to the target value of 1 kV without having a large overshoot, although a margin for an overshoot exceeding 1 kV since a detection of the second reference voltage is not large (margin voltage A≈0 V).

FIG. 6B illustrates an example of the output waveform of the high voltage generating device in which the transient target voltage is set to 90% of the voltage and the voltage is raised by 300 V with one-pulse driving at the time of start-up. The final attainment target voltage value is 1 kV, and hence a detection of the voltage is performed at the transient target voltage of 0.9 kV that is 90% of the target, and then the second transient area starts. However, the power driven before entering the second transient area is already applied, and hence the output voltage is raised to 1.2 kV, and the second transient area starts after the output voltage exceeds 1.2 kV. That is, although the voltage reaches the transient target voltage of 0.9 kV in 0.06 ms since the start-up (0 ms), the second transient area does not start at the ideal transition start time of 0.06 ms to the slow charging. The actual transition start time to the slow charging is after the response delay time of 20 μs. Therefore, a voltage rise of 0.3 kV is generated due to the response delay. Therefore, when the second transient area starts, a large overshoot (overshoot voltage B) of 200 V (=1.2 kV−1 kV) is already generated. In the comparative example, when the raising capability of the high voltage generating circuit is not high as shown in FIG. 6A, no problem has occurred. However, when the raising capability of the high voltage generating device is considerably increased in such a manner that the voltage rises to the target voltage only with an input of a few pulses in order to considerably reduce the rise time as shown in FIG. 6B, a large overshoot is generated.

In the First Embodiment

Figure 6C:
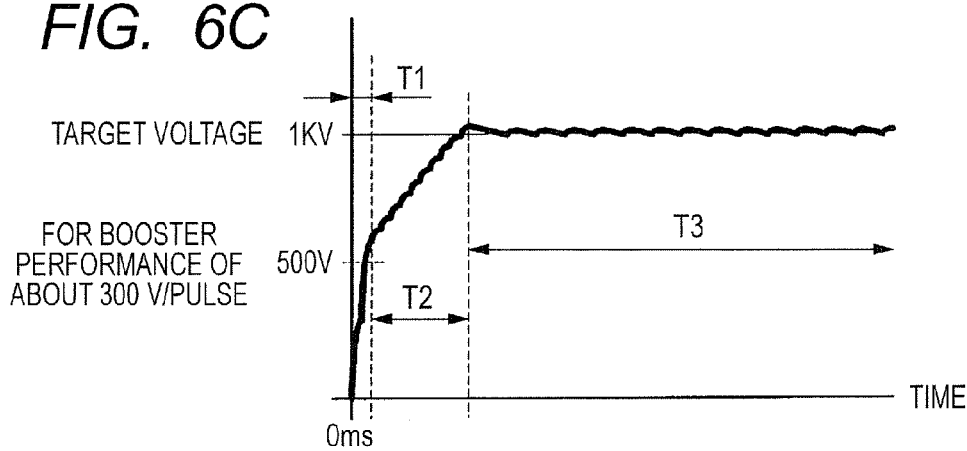
FIG. 6C illustrates an example of a voltage rise waveform of the high voltage generating device according to the first embodiment with a target voltage of +1 kV.

An example of the output waveform of the high voltage generating device according to the first embodiment is shown in FIG. 6C. The operation of the high voltage generating circuit according to the first embodiment is divided into three time areas including a rapid rise period T1 right after the start-up (first transient area), a constant voltage control standby period T2 before the voltage reaches the target voltage (second transient area), and a constant voltage control period T3 after the voltage reaches the target voltage (steady area). In the first transient area, the comparator CMP11 is in an open output state, and the booster transformer T1 is switched by a PWM signal generated with a higher PWM control voltage Vth as the slice level. In the first transient area, the load voltage rises at a high slew rate of 300 V/pulse (a predetermined rate of change). When the transient target voltage is detected, the comparator CMP11 is changed to the low level output, and the operation makes a transition to the second transient area. In the second transient area, the booster transformer T1 is switched by a PWM signal generated with a lowered PWM control voltage Vth as the slice level. For example, in the first embodiment, the load voltage rises at a relatively low slew rate of 50 V/pulse (a rate of change smaller than the predetermined rate of change). When the output voltage reaches the final attainment target voltage, the on-duty width of the PWM signal is instantly set to zero, and the raising operation of the high voltage generating circuit is rapidly turned off. The slew rate is as low as 50 V/pulse when the voltage reaches the final attainment target voltage, and hence the maximum amount of the overshoot right after the voltage reached the final attainment target voltage is suppressed to a value as small as 50 V.

In the first embodiment, the transition from the first transient area for a high speed rise to the second transient area is set at a slightly lower transient target voltage than the final attainment target voltage when the value of the final attainment target voltage is large and at a greatly lower transient target voltage than the final attainment target voltage when the value of the final attainment target voltage is small. For example, in the first embodiment, the transient target voltage is set to +4.5 kV that is 90% of the voltage when the final attainment target voltage is +5 kV, set to +0.5 kV that is 50% of the final attainment target voltage when the final attainment target voltage is +1 kV, and set to +0 V that is 0% of the voltage when the final attainment target voltage is +500 V. As a result, whether the target value is +5 kV or +1 kV, the overshoot right after the voltage reached the target value is suppressed regardless of the magnitude of the target voltage value, and the output voltage can reach the target value in a short time. The transient target value in FIG. 6C is merely an example, and it is not limited within the example as long as the transient target value is set to a greatly lower value when the value of the final attainment target voltage is small. For example, when the final attainment target value is +1 kV, +0.6 kV that is 60% of the voltage or +0.3 kV that is 30% of the voltage may be set.

(Comparison with the Comparative Example Regarding an Operation in the Steady Area)

Figure 7A:
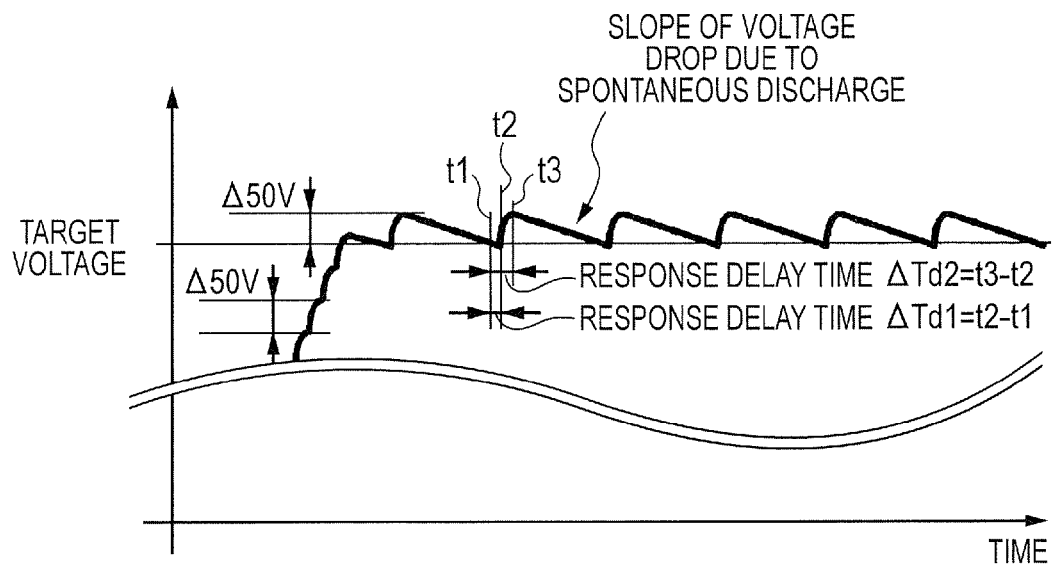
FIGS. 7A, 7B, and 7C illustrate voltage waveforms output from the high voltage generating device according to the comparative example showing a portion near the target voltage in an enlarged manner.
Figure 7B:
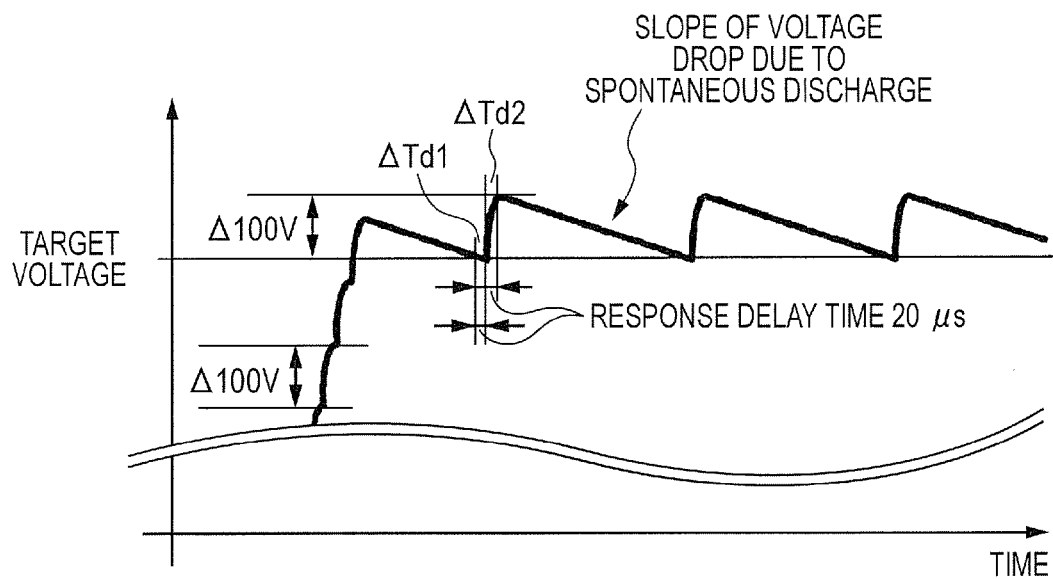
Figure 7C:
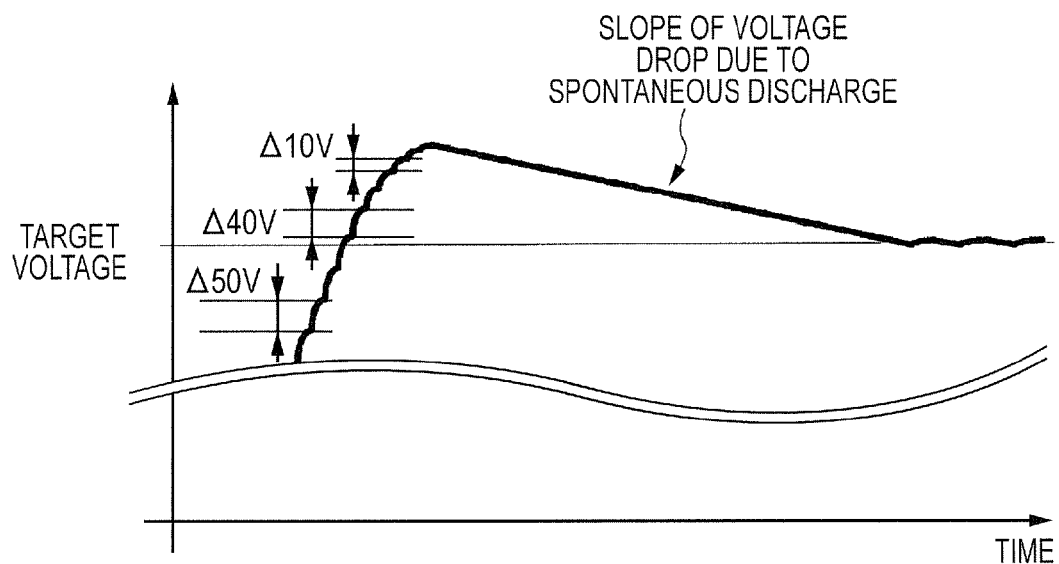
Figure 7D:
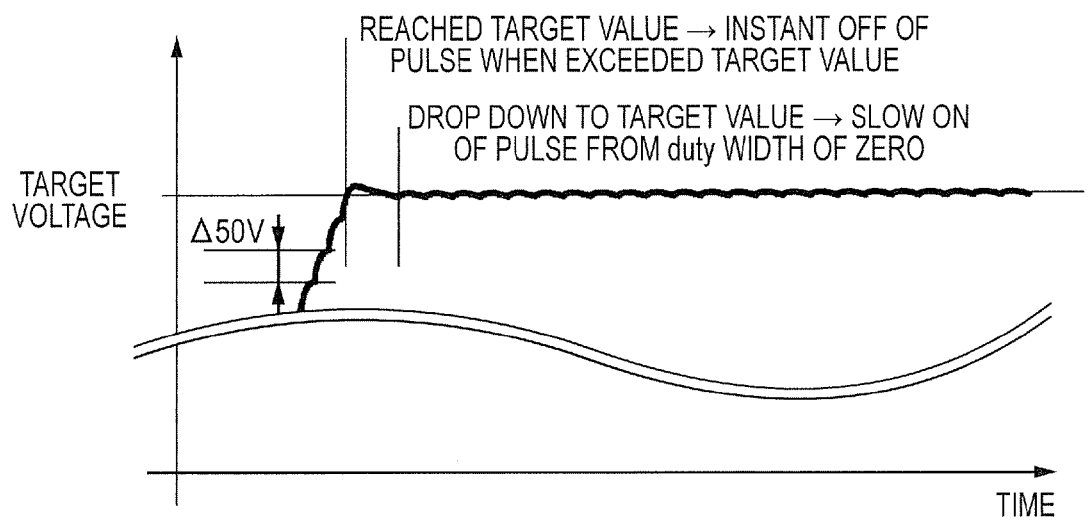
FIG. 7D illustrates a voltage waveform of the high voltage generating device according to the first embodiment showing a portion near the target voltage in an enlarged manner.

An operation in the constant voltage control period T3 (steady area) after the voltage reached the target voltage is described by comparing a specific example of the high voltage waveform according to the first embodiment with an example of the high voltage waveform according to the comparative example with reference to FIGS. 7A to 7D. The example of the waveform according to the first embodiment is shown in FIG. 7D. It is necessary to speed up the responsiveness by increasing the on-duty width of the PWM signal right after the start-up in order to achieve a faster rise time. However, when the responsiveness is speeded up, in the constant voltage control operation, the output voltage is likely to fluctuate up and down across the target value as a boundary so that an overshoot is repeated. This is shown in FIG. 7A. In this case, the output voltage rises by 50 V with the one-pulse input in the second transient area, and when the voltage reached the target voltage, the switching is instantly turned off. After the switching is instantly turned off, the voltage value drops due to a spontaneous discharge of an electrical charge of the charged capacitive load. That is, even if the switching of the high voltage generating circuit is instantly turned off, the load voltage does not drop at a speed higher than the spontaneous discharge. This is shown in FIG. 7A as a slope of the voltage drop due to the spontaneous discharge.

When the load voltage drops down to the target voltage, the high voltage generating circuit starts the switching again. When the switching is started, a pulse is input and the load voltage rises again. After that, the switching is turned off again when the voltage reaches the target voltage, and this control is repeated. However, even if the pulse input until the switching is turned off is a single pulse, the pulse is already input when the voltage reached the target voltage. Therefore, a small voltage oscillation (ripple or hunching) by the voltage corresponding to the single pulse, i.e., 50 V, is generated. A delay time $\Delta Td1$ (=t2−t1) of the response is a delay time from a time when it is detected that the output voltage is lower than the target voltage to a time when the output voltage actually rises by the control. A delay time $\Delta Td2$ (=t3−t2) of the response is a delay time from a time when it is detected that the output voltage exceeds the target voltage to a time when the output voltage actually drops by the control. The delay times $\Delta Td1$ and $\Delta Td2$ are the above-mentioned response delay time of 20 µs, and this delay time is dominated by the input/output response time of the booster circuit (transformer).

FIG. 7B shows an example of the waveform when the voltage rises by 100 V with the one-pulse input in the second transient area. An overshoot is generated by the same phenomenon as that in FIG. 7A. However, the amount of the overshoot is doubled to 100 V. The slew rate when the overshoot voltage drops down to the target voltage is determined by a time constant of the spontaneous discharge by the capacitance and the resistance value of the load. Therefore, the overshoot is repeated at a cycle that is two times of that in the case of FIG. 7A.

In the high voltage generating device described in Japanese Patent Application Laid-Open No. H09-093920, the hunching of the target voltage is maintained to be small by slightly increasing or decreasing the output voltage with a slight increase or decrease of the input voltage to a PWM circuit in the hold charge area in which a control is performed to hold the target voltage value. However, the input voltage is decreased only slightly also at the time of making a transition from the slow charging area to the hold charging area, the overshoot at the time of reaching the target value is likely to be increased as shown in FIG. 7C.

On the other hand, in the high voltage generating device according to the first embodiment, as shown in FIG. 7D, when the detection voltage value exceeds the target voltage value, the on-duty width of the PWM signal is instantly set to zero (when exceeded, the pulse is instantly turned off). After that, the output voltage drops, and when the output voltage becomes equal to or lower than the target voltage again, the switching is started again with a slow on-duty in which the on-duty width is slowly broadened from zero. Therefore, the overshoot right after reaching the target voltage value is suppressed to a small value compared to the case of FIG. 7C, and at the same time, the raising capability of the load voltage in the constant voltage control period T3 is suppressed. As a result, in FIG. 7D according to the first embodiment, the voltage oscillation (ripple or hunching) generated in the steady area is greatly suppressed compared to the cases of FIGS. 7A and 7B. That is, the overshoot and the voltage oscillation (ripple or hunching) can be suppressed to small values in the whole steady area.

In the above-mentioned first embodiment, the transient target voltage is set to a slightly lower value when the final attainment target voltage is high and to a greatly lower value when the final attainment target voltage is low. The PWM control is performed in which the target is maintained by instantly switching the on-duty width of the PWM signal to a narrower width after it is detected that the voltage reaches the transient target voltage and instantly setting the on-duty width to zero when the detection voltage value exceeds the final attainment target voltage value. Therefore, according to the first embodiment, the output voltage can reach the target value in a considerably short time without generating an overshoot even when the raising capability of the high voltage generating device is considerably increased and the final attainment target voltage is set to various values in a relatively broad range including small value and large value. In addition, in the transient area of the raising, the output is instantly started with a PWM signal having the on-duty width to be maximum, and in the steady area in which the target value is maintained thereafter, the output is made while setting a slow time constant to the raising side on which the on-duty width is broadened. With this configuration, even with the high voltage generating device in which the raising capability is considerably increased so that the voltage reaches the target value in a short time, the voltage oscillation (ripple or hunching) can be suppressed to a small value in the whole steady area.

As described above, according to the first embodiment, even with the high voltage generating device in which the rise time is greatly shortened and the target voltage is set in a broad range, the output voltage can reach the target voltage in a short time without generating the overshoot or the undershoot at the time of raising.

In the above-mentioned first embodiment, although a configuration is described in which a positive polarity high voltage is output as the high voltage, it can be applied to a configuration in which a negative polarity high voltage is output. When it is applied to the negative polarity high voltage, instead of the voltage in a range of +1 kV to +4 kV shown in FIGS. 4A and 4B according to the above-mentioned first embodiment, for example, the voltage in a range of −1 kV to −4 kV may be output.

A second embodiment of the present invention is described.

In the same manner as the high voltage generating device according to the first embodiment, a high voltage generating device according to the second embodiment divides the transient time area from the start-up of the high voltage generating device until the voltage reaches the target voltage into two areas including the rapid rise period T1 right after the start-up and the constant voltage control standby period T2 before the voltage reaches the target voltage. When a predetermined transient target voltage is detected, a transition is performed from the rapid rise period to the constant voltage control standby period. The on-duty width of the PWM signal for switching is set in each of the rapid rise period T1 and the constant voltage control standby period T2 in a switched manner. In the constant voltage control standby period T2 before the voltage reaches the final attainment target value, the on-duty width is narrowed so that the raising capability is controlled to be low. The transition from the rapid rise period T1 to the constant voltage control standby period T2 in the transient state is performed based on a detection of the predetermined transient target voltage. The predetermined transient target voltage is set to a slightly smaller value when the final attainment target voltage value is large, and set to an even smaller value when the final attainment target voltage value is small. In addition, the high voltage generating device according to the second embodiment detects a load capacitance and a load resistance of the high voltage output portion, and sets the transient target voltage in a variable manner based on a result of the detection.

(High Voltage Generating Device)

Figure 2C:
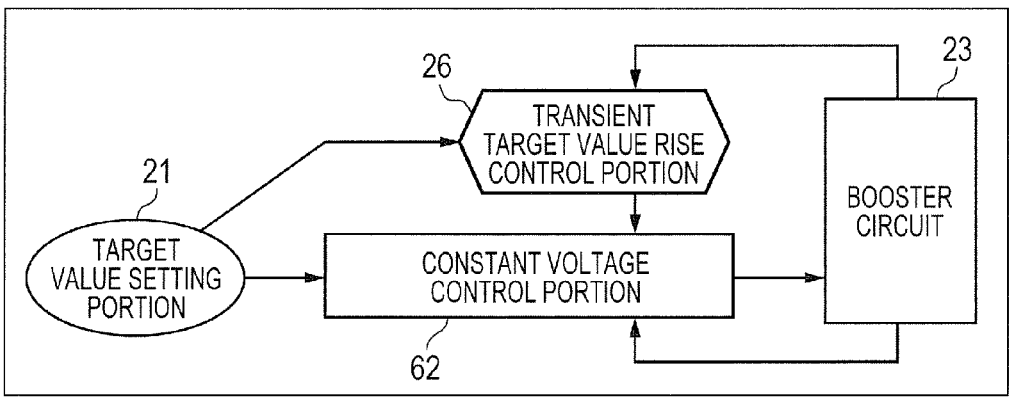
FIG. 2C is a functional block diagram of the high voltage generating device according to the second embodiment.

FIG. 2C is a functional block diagram of a main portion of the high voltage generating device according to the second embodiment. The high voltage generating device according to the second embodiment further includes a transient target value rise control portion 26 configured to control the transient target voltage in a variable manner in the transition from the rapid rise period T1 to the constant voltage control standby period T2. The target value setting portion 21 respectively controls the transient target value rise control portion 26 and the constant voltage control portion 62.

Figure 8:
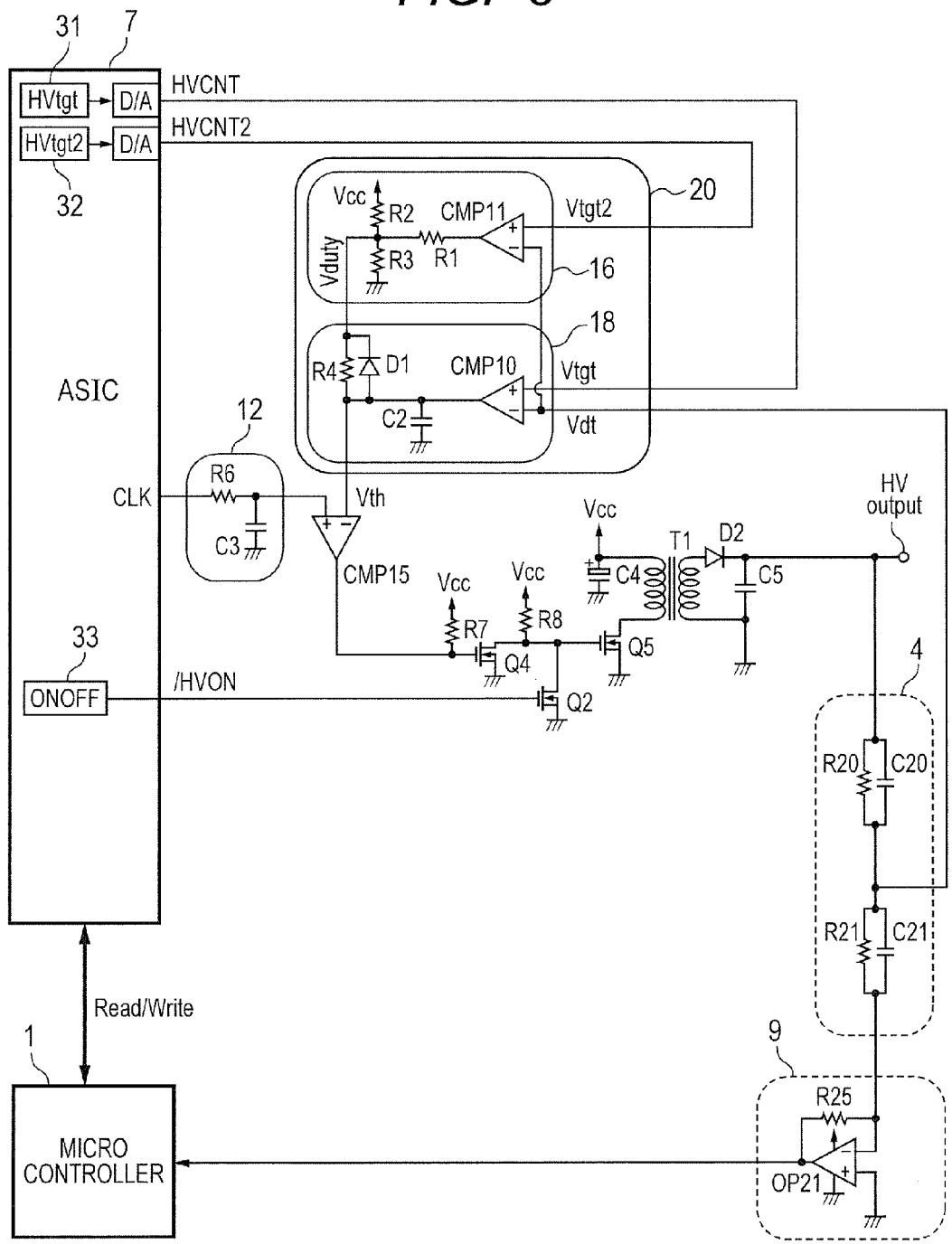
FIG. 8 illustrates a circuit configuration of the high voltage generating device according to the second embodiment.

FIG. 8 illustrates the high voltage generating device according to the second embodiment. In the second embodiment, the ASIC 2 described in the first embodiment is replaced with an ASIC 7 in which a high voltage control signal HVCNT2 is added. Moreover, instead of the transient target value generating circuit 17, the high voltage control signal HVCNT2 output from the ASIC 7 is directly coupled to a maximum duty switching circuit 16 included in a PWM control voltage generating circuit 20. The other configurations are the same as those of the first embodiment. The same reference numeral or symbol is assigned to the same structural element or signal described in the first embodiment, and a description thereof is omitted.

The PWM control voltage generating circuit 20 (control unit) is described below. A high voltage control signal HVCNT and the high voltage control signal HVCNT2 output from the ASIC 7 and a detection value Vdt of a load voltage detected by an output voltage detecting circuit 4 are coupled to the PWM control voltage generating circuit 20. A micro controller 1 (setting unit) sets predetermined values to an HVtgt portion 31 that is a register for setting the final attainment target value and an HVtgt2 portion 32 that is a register for setting the transient target value, which are included in the ASIC 7. Whereby, the final attainment target voltage value and the transient target voltage value of the high voltage generating device are controlled. The ASIC 7 outputs the high voltage control signals HVCNT and HVCNT2 corresponding to the HVtgt portion 31 and the HVtgt2 portion 32 to the outside as analog signals via D/A converters. The PWM control voltage generating circuit 20 sets the final attainment target value of the load voltage by the high voltage control signal HVCNT and the transient target value of the load voltage by the high voltage control signal HVCNT2. A feedback control of the PWM control voltage Vth to be output to a comparator CMP15 is performed while the detection voltage value Vdt output from the output voltage detecting circuit 4 is monitored.

The PWM control voltage generating circuit 20 includes the maximum duty switching circuit 16 and an output voltage control circuit 18. The high voltage control signal HVCNT2 is coupled to the maximum duty switching circuit 16. A transient target value Vtgt2 set by the high voltage control signal HVCNT2 is coupled to a comparator CMP11 of the maximum duty switching circuit 16 and is compared with the detection voltage value Vdt of the load portion. When the detection voltage value Vdt is equal to or lower than the transient target value Vtgt2, an output of the comparator CMP11 becomes opened, and the maximum duty switching circuit 16 outputs a voltage Vduty obtained by dividing a power source voltage Vcc with resistors R2 and R3 to the output voltage control circuit 18. The voltage Vduty is the maximum value of the slice level when the comparator CMP15 generates the PWM signal. That is, the voltage Vduty sets the maximum on-duty width of the PWM signal generated by the comparator CMP15.

When the detection voltage value Vdt is equal to or higher than the transient target value Vtgt2, the output of the comparator CMP11 becomes a low level. The voltage Vduty output from the maximum duty switching circuit 16 is dropped to a divided value also including a resistor R1, and the slice level, when the comparator CMP15 generates the PWM signal, drops. That is, the maximum on-duty width of the PWM signal generated by the comparator CMP15 is changed to a narrower width. When dropping the voltage Vduty, a switching of the voltage Vduty is instantly performed by discharging an electric charge of a charged capacitor C2 via a diode D1 in the output voltage control circuit 18.

In this manner, the maximum duty switching circuit 16 switches the PWM control voltage Vth instantly at a time when the detection voltage value Vdt of the load portion reaches the transient target value Vtgt2, to thereby perform an operation of switching the on-duty width of the PWM signal to a narrower width. The output voltage control circuit 18 performs the same operation as in the first embodiment, and a detailed description thereof is omitted. In the same manner as in the first embodiment, the output voltage control circuit 18 instantly sets the on-duty width to zero to rapidly turn off the high voltage generating circuit, when the detection voltage value Vdt exceeds the target voltage value Vtgt. On the other hand, when the detection voltage value Vdt is lower than the target voltage value Vtgt, the output voltage control circuit 18 slowly turns on the high voltage generating circuit by setting the time constant on the start-up. As a result, a voltage oscillation (ripple or hunching) generated by the feedback control for maintaining the constant voltage can be greatly suppressed.

(Change of a Rise Waveform Depending on Change of Resistance Value of the Output Load Portion)

Next, a control operation of changing the transient target value depending on a change of resistance value of the output load portion of the high voltage generating device is described. FIG. 9A illustrates a change of the rise waveform of the high voltage generating device depending on a change of the resistance value of the output load portion. A rise curve A (dotted line) indicates a rise waveform when the final attainment target voltage is set to +4 kV and the transient target voltage is set to +3.6 kV. After the transient target voltage of +3.6 kV is detected at a time t1, the rise slew rate is changed to a gentle slope and the voltage reaches the final attainment target voltage of +4 kV at a time t2. As against the rise curve A, a rise curve A' (solid line) indicates a rise waveform when the load resistance value is decreased due to an influence of the temperature and humidity environment. The slew rate of the rise curve A' shows a more gentle slope on the whole than that of the rise curve A, and the time t1 in the rise curve A at which the voltage reaches the transient target value is extended to a time t1' in the rise curve A'. Similarly, the time t2 in the rise curve A at which the output voltage reaches the final attainment target value is greatly extended to a time t2' in the rise curve A'. In this manner, the rise waveform of the high voltage generating device is changed depending on the change of the load resistance.

(Calculation of the Resistance Value of the Output Load Portion)

A method of raising the high voltage according to the second embodiment is described below. The micro controller 1 detects a current flowing through a load portion HVoutput by an output current detecting circuit 9 (current detecting unit). Then a resistance value of the output load portion is calculated based on the detected current value and the final attainment target voltage set in the register HVtgt of the ASIC 7. Depending on the resistance value, the transient target voltage is set in a variable manner by using the high voltage control signal HVCNT2. In the second embodiment, as shown in FIG. 9A, a control to increase the transient target value is performed in response to a decrease of the load resistance value due to the influence of the temperature and humidity environment. A rise waveform after the control is illustrated in FIG. 9B. In a rise curve C (solid line) shown in FIG. 9B, the transient target voltage is set to +3.8 kV that is 200 V higher than that in the rise curve A' shown in FIG. 9A. The voltage reaches the transient target voltage at a time t1". Although only 200 V is left to the final attainment target voltage, the slew rate has a gentler slope than that of the rise curve A on the whole, and hence the voltage reaches the final attainment target voltage without generating an overshoot. The time at which the voltage reaches the final attainment target value, which is greatly extended in the rise curve A' due to the decrease of the load resistance, is considerably shortened to a time t2" in the rise curve C according to the second embodiment. When the load resistance is increased due to the influence of the temperature and humidity environment, a control of lowering the transient target value is performed.

In the above-mentioned second embodiment, a fluctuation in the load capacitance and the load resistance value of the high voltage output portion is detected, the transient target voltage is set in a variable manner based on a result of the detection, and after it is detected that the voltage reaches the transient target voltage, the on-duty width of the PWM signal is instantly switched to a narrower width. With this configuration, even when the raising capability of the high voltage generating device is considerably increased, the final attainment target voltage is set to various values in a relatively broad range including a small value and a large value, and the load resistance is greatly changed, the following effect can be obtained. That is, the output voltage can reach the target value in a considerably short time without generating an overshoot. In addition, in the same manner as in the first embodiment, the output is instantly started with a PWM signal having the on-duty width which is the maximum value in the transient area of the raising, and then in the steady area, in which the target value is maintained thereafter, a slow time constant is set to the raising side on which the on-duty width is broadened for output. With this configuration, even with the high voltage generating device in which the raising capability is considerably increased so that the voltage reaches the target value in a short time, the voltage oscillation (ripple or hunching) can be suppressed to a small value in the whole steady area.

As described above, according to the second embodiment, even with the high voltage generating device in which the rise time is greatly shortened and the target voltage is set in a broad range, the output voltage can reach the target voltage in a short time without generating the overshoot or the undershoot at the time of raising.

Although a configuration in which a positive polarity high voltage is output as the high voltage is described in the above-mentioned second embodiment, it can be applied to a configuration in which a negative polarity high voltage is output. When it is applied to the negative polarity high voltage, instead of the voltage in a range of +1 kV to +4 kV shown in FIGS. 4A and 4B according to the above-mentioned second embodiment, for example, the voltage in a range of −1 kV to −4 kV may be output.

A third embodiment of the present invention is described below.

(Example of Applying the High Voltage Generating Device)

The high voltage generating device according to the first or second embodiment can be applied to, for example, an electrophotographic image forming apparatus. An example of applying the high voltage generating device is described for a laser beam printer as an example of the electrophotographic image forming apparatus.

Figure 10A:
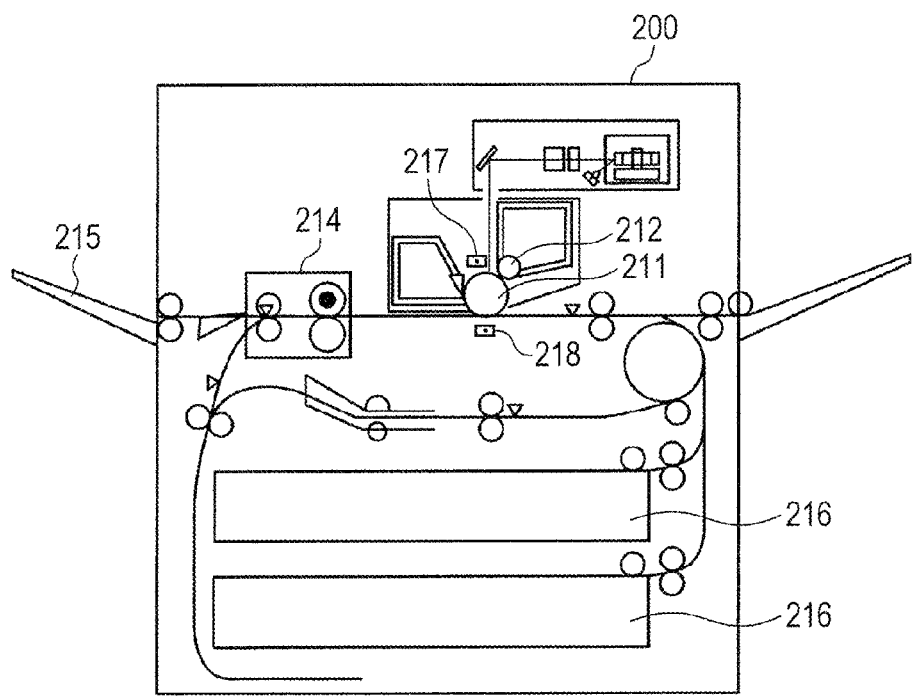
FIGS. 10A and 10B illustrate a configuration of an image forming apparatus according to a third embodiment.

The high voltage generating device according to the above-mentioned first or second embodiment can be employed as a high voltage source for applying a high voltage to an image forming portion of an electrophotographic printer. FIG. 10A illustrates a schematic configuration of a laser beam printer as an example of the electrophotographic printer. The laser beam printer 200 includes a photosensitive drum 211 as an image bearing member on which an electrostatic latent image is formed, a charging portion 217 (charging unit) that uniformly charges the photosensitive drum 211, and a developing portion 212 (developing unit) that develops the electrostatic latent image formed on the photosensitive drum 211 with toner. A toner image developed on the photosensitive drum 211 is transferred to a sheet (not shown) as a recording material fed from a cassette 216 by a transferring portion 218 (transferring unit), the toner image transferred to the sheet is fixed by a fixing portion 214, and the sheet is then discharged to a tray 215. The photosensitive drum 211, the charging portion 217, the developing portion 212, and the transferring portion 218 are included in the image forming portion. The image forming apparatus to which the high voltage generating device according to the first or second embodiment is applicable is not limited to the laser beam printer illustrated in FIG. 10A, and can be, for example, an image forming apparatus including multiple image forming portions. In addition, it can be an image forming apparatus that includes a primary transferring portion that transfers the toner image on the photosensitive drum 211 to an intermediate transfer belt and a secondary transferring portion that transfers the toner image on the intermediate transfer belt to the sheet.

Figure 10B:
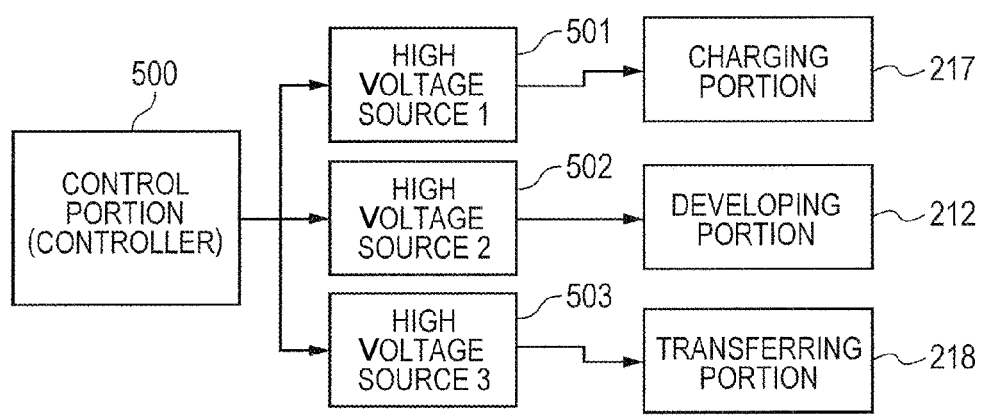

FIG. 10B illustrates a configuration for outputting high voltages output from multiple high voltage sources (the high voltage generating device according to the first or second embodiment) included in the laser beam printer 200 to the charging portion 217, the developing portion 212, and the transferring portion 218, respectively. A first high voltage source 501 outputs the high voltage to the charging portion 217, a second high voltage source 502 outputs the high voltage to the developing portion 212, and a third high voltage source 503 outputs the high voltage to the transferring portion 218. That is, the charging portion 217, the developing portion 212, and the transferring portion 218 are the load portions of the high voltage generating devices, respectively. A value of the high voltage output from each of the first high voltage source 501 to the third high voltage source 503 is controlled to a desired voltage value in response to a control signal output from a controller 500 as a control portion. For example, when outputting the high voltage to the charging portion 217, a current flowing through the charging portion 217 is detected by the above-mentioned output current detecting circuit 9, and the output is adjusted such that the detected current value approaches a predetermined value. When outputting the high voltage to the transferring portion 218, a current flowing through the transferring portion 218 is detected by the above-mentioned output current detecting circuit 9, and the output is adjusted such that the detected current value approaches a predetermined value. When outputting the high voltage to the developing portion 212, a voltage is detected by the above-mentioned output voltage detecting circuit 4, and the output is adjusted such that the detected voltage value approaches a predetermined value. The high voltage generating device according to the first or second embodiment can be employed to apply the high voltage required to form an image.

As described above, by applying the high voltage source according to the first or second embodiment to an electrophotographic printer as a high voltage source, a high-speed image forming apparatus can be achieved and the FPOT can be shortened. According to the third embodiment, even with the image forming apparatus including the high voltage generating device in which the rise time is greatly shortened and the target voltage is set in a broad range, the voltage can reach the target voltage in a short time without generating the overshoot or the undershoot at the time of raising.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-203417, filed Sep. 16, 2011, which is hereby incorporated by reference herein in its entirety.

What is claimed is:
1. A high voltage generating device, comprising:
a transformer;
a driving portion configured to drive a primary side of the transformer;
a signal generating portion configured to generate a driving signal for driving the driving portion;
a voltage output portion configured to output a voltage generated on a secondary side of the transformer;
a voltage detecting portion configured to detect a voltage output from the voltage output portion;
a current detecting portion configured to detect current flowing through the voltage output portion; and
a control portion configured to raise the voltage output from the voltage output portion to an output target voltage by controlling the driving signal generated by the signal generating portion based on the voltage detected by the voltage detecting portion, the control portion raising the voltage output from the voltage output portion with a predetermined rate of change until the voltage detected by the voltage detecting portion reaches a transient target voltage smaller than the output target voltage, the control portion raising the voltage output from the voltage output portion with a rate of change smaller than the predetermined rate of change after the voltage detected by the voltage detecting portion reaches the transient target voltage,
wherein the control portion changes the transient target voltage from a first target value to a second target value based on a load resistance value according to current detected by the current detecting portion.
2. The high voltage generating device according to claim 1, wherein the control portion changes the transient target voltage from the first target value to the second target value which is larger than the first target value when the load resistance value decreases.

3. The high voltage generating device according to claim 2, wherein a resistance value of the load is calculated based on the detection result of the current detecting portion and the output target voltage.

4. The high voltage generating device according to claim 1, wherein the driving signal generated by the signal generating portion is a PWM signal; and the control portion sets an on-width of the PWM signal to a predetermined width until the voltage detected by the voltage detecting portion reaches the transient target voltage, and the control portion sets the on-width of the PWM signal to a width narrower than the predetermined width after the voltage detected by the voltage detecting portion reaches the transient target voltage.

5. The high voltage generating device according to claim 4, wherein, when the voltage detected by the voltage detecting portion exceeds the output target voltage, the control portion sets an on-width of the PWM signal to zero.

6. The high voltage generating device according to claim 5, wherein, when the voltage detected by the voltage detecting portion is lower than the output target voltage, the control portion slowly broadens the on-width of the PWM signal from zero by a predetermined time constant.

7. An image forming apparatus, comprising:

an image forming portion configured to form an image; and a high voltage generating portion configured to apply a high voltage to the image forming portion, the high voltage generating portion comprising:

a transformer;

a driving portion configured to drive a primary side of the transformer;

a signal generating portion configured to generate a driving signal for driving the driving portion;

a voltage output portion configured to output a voltage generated on a secondary side of the transformer;

a voltage detecting portion configured to detect a voltage output from the voltage output portion; and a current detecting portion configured to detect current flowing through the voltage output portion;

a control portion configured to raise the voltage output from the voltage output portion to an output target voltage by controlling the driving signal generated by the signal generating portion based on the voltage detected by the voltage detecting portion, the control portion raising the voltage output from the voltage output portion with a predetermined rate of change until the voltage detected by the voltage detecting portion reaches a transient target voltage smaller than the output target voltage, the control portion raising the voltage output from the voltage output portion with a rate of change smaller than the predetermined rate of change after the voltage detected by the voltage detecting portion reaches the transient target voltage, wherein the control portion changes the transient target voltage from a first target value to a second target value based on a load resistance value according to current detected by the current detecting portion.

8. The image forming apparatus according to claim 7, wherein the image forming device comprises:

an image bearing member on which a latent image is formed;

a charging portion configured to charge the image bearing member;

a developing portion configured to develop the latent image formed on the image bearing member; and a transferring portion configured to transfer an image developed by the developing portion to a recording material; and the high voltage generating portion applies the high voltage to at least one of the charging portion, the developing portion, and the transferring portion.

9. The image forming apparatus according to claim 7, wherein the control portion changes the transient target voltage from the first target value to the second target value which is larger than the first target value when the load resistance value decreases.

10. The image forming apparatus according to claim 9, wherein a resistance value of the image forming portion is calculated based on the detection result of the current detecting portion and the output target voltage.

* * * * *